(12) United States Patent
Sampson, II et al.

(10) Patent No.: US 12,478,355 B2
(45) Date of Patent: Nov. 25, 2025

(54) ULTRASOUND SYSTEM SELF-TEST DATA FEEDBACK FOR SYSTEM TREND ANALYSIS (71) Applicant: KONINKLIJKE PHILIPS N.V., Eindhoven (NL)

(72) Inventors: Richard Anthony Sampson, II, Everett, MA (US); Changhong Hu, Bothell, WA (US); Shubha Rao, Bothell, WA (US); Justus Daniel Smitchger, Bothell, WA (US); Daniel Schmiesing, Granite Falls, WA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 32 days.

(21) Appl. No.: 18/268,642

(22) PCT Filed: Dec. 16, 2021

(86) PCT No.: PCT/EP2021/086046
§ 371 (c)(1),
(2) Date: Jun. 21, 2023

(87) PCT Pub. No.: WO2022/136077
PCT Pub. Date: Jun. 30, 2022

(65) Prior Publication Data
US 2024/0032897 A1 Feb. 1, 2024

Related U.S. Application Data (60) Provisional application No. 63/129,436, filed on Dec. 22, 2020.

(51) Int. Cl.
*A61B 8/00* (2006.01)

(52) U.S. Cl.
CPC ................ *A61B 8/58* (2013.01); *A61B 8/565* (2013.01)

(58) Field of Classification Search
CPC .............................. A61B 8/58; G01S 7/5205
See application file for complete search history.

(56) References Cited

U.S. PATENT DOCUMENTS 6,272,469 B1 * 8/2001 Koritzinsky ........... G16H 40/63
128/923
6,473,659 B1 * 10/2002 Shah ................... G06F 11/2242
702/179

(Continued)

FOREIGN PATENT DOCUMENTS

JP 2001327497 A 11/2001

OTHER PUBLICATIONS

Schölzel et al., "An adaptive self-test routine for in-field diagnosis of permanent faults in simple RISC cores," (Apr. 8-20, 2012) 2012 IEEE 15th International Symposium on Design and Diagnostics of Electronic Circuits & Systems (DDECS), Tallinn, Estonia, 2012, pp. 312-317. (Year: 2012).*

(Continued)

*Primary Examiner* — Keith M Raymond
*Assistant Examiner* — Ashish S Jasani (57) ABSTRACT An ultrasound system is configured to perform periodic self-testing of the system's hardware components. Results of the self-testing are stored on the ultrasound system in a data log, and periodically uploaded to a self-test database. The self-test database is sorted, then analyzed by engineers of the ultrasound system manufacturer to discern variances or trends in ultrasound system hardware performance or operation. As a result of the analysis, updated or improved (Continued)

self-test programs are developed by the system manufacturer and uploaded to and installed on ultrasound systems of the installed base of systems.

17 Claims, 5 Drawing Sheets

(56) References Cited

U.S. PATENT DOCUMENTS

| | | | |
|---|---|---|---|
| 6,678,626 B2 * | 1/2004 | Fallon | G01S 7/52034 |
| | | | 702/108 |
| 6,689,055 B1 | 2/2004 | Mullen et al. | |
| 2003/0115018 A1 * | 6/2003 | Sharma | G01S 15/899 |
| | | | 702/183 |
| 2004/0093184 A1 * | 5/2004 | Hendrickson | G16H 40/40 |
| | | | 702/184 |
| 2004/0153862 A1 | 8/2004 | Grellmann et al. | |
| 2004/0250163 A1 * | 12/2004 | Roddy | G06F 11/2257 |
| | | | 714/25 |
| 2013/0283916 A1 | 10/2013 | Jersey et al. | |
| 2020/0088862 A1 * | 3/2020 | Lundberg | G01S 7/5205 |
| 2020/0103894 A1 | 4/2020 | Cella et al. | |
| 2020/0245979 A1 * | 8/2020 | Shidara | A61B 8/445 |
| 2021/0177683 A1 * | 6/2021 | Dietz | B60B 33/06 |

OTHER PUBLICATIONS

International Search Report and Written Opinion for PCT/EP2021/086046; Mailing date: Feb. 24, 2022, 13 pages.

Philips: "M2540 Ultrasound System Field Service Manual", Philps, 2002, retrieved from: https://manualzz.com/doc/3383045/philips-m2540-user-s-manual, 220 pages.

Kim, B. et al., "Optimized Signature-Based Statistical Alternate Test for Mixed-Signal Performance Parameters", Eleventh IEEE European Test Symposium (ETS'06), 2006, pp. 199-204.

* cited by examiner

ULTRASOUND SYSTEM SELF-TEST DATA FEEDBACK FOR SYSTEM TREND ANALYSIS

CROSS-REFERENCE TO PRIOR APPLICATIONS

This application is the U.S. National Phase application under 35 U.S.C. § 371 of International Application No. PCT/EP2021/086046, filed on Dec. 16, 2021, which claims the benefit of U.S. Provisional Patent Application Ser. No. 63/129,436, filed on Dec. 22, 2020. These applications are hereby incorporated by reference herein.

The present disclosure relates to ultrasound system performance and component failure analysis and, in particular, to the feedback of resident self-test data from ultrasound systems for trend analysis and improved system testing.

Ultrasound systems are available in a wide variety of configurations. For example, the Lumify system, available from Philips Healthcare of Bothell, Washington is a highly portable ultrasound system, consisting of no more than an ultrasound probe and display and user interface software installed on a user's tablet computer or smartphone. All of the ultrasound-specific hardware is contained in integrated circuitry such as microbeamformer ASICs and FPGA IC's inside the probe. More sophisticated cart-borne ultrasound systems such as the Philips EPIQ system which are capable of advanced features such as 3D, multiline, and shearwave imaging contain much of their ultrasound-specific and other hardware components on printed circuit boards (p.c.b.'s) contained within the system mainframe. The p.c.b.'s can be easily swapped out for new boards in the event of a hardware failure, and can be replaced as needed with later-generation p.c.b.'s, enabling cart-borne ultrasound systems to enjoy greatly extended service lives.

Maintaining the reliability and service life of an ultrasound system may be obtained by built-in, onboard system testing. Like other medical devices, high-performance ultrasound systems usually are equipped with resident self-test programs which operate periodically to test ultrasound system components and record the results of such tests. Self-testing may generally be performed at times specified by the ultrasound system owner, such as at power-on, or daily, or weekly, or some other user-selected interval. The results of an ultrasound system's self-testing are generally saved in a system data storage device as a log of such testing, which may be retrieved by a service engineer who is maintaining or servicing the system. The self-test results help guide the service engineer on which ultrasound system components are performing properly, and which are at or near critical performance limits.

Ultrasound system reliability may be obtained, in part by the system uptime, e.g. the percentage of time that an ultrasound system is available for use and not disabled due to a service or maintenance problem. All ultrasound system manufacturers strive to provide their customers with the maximum amount of uptime. Good uptime performance may be obtained by preventing service problems before they occur, repairing or replacing ultrasound system components before their performance has reached a failure level. Resident self-testing can play a role in such system performance surveillance, as it provides relevant information on how components of an ultrasound system are performing over a period of self-test days. However, logs of data from self-testing are usually available only when a service engineer visits the site of the ultrasound system and retrieves the self-test log data or an ultrasound system customer is able to access the self-test data log and send it to a service engineer for review. It would be desirable for such self-test data logs to be forwarded automatically to the service engineer on a regular basis. It would be even more desirable for self-test data logs to be relayed to the ultrasound system manufacturer, where the data can be analyzed to discern potential future system failure issues. It would also be desirable for the self-test data to be reviewed by the ultrasound system manufacturer to discern developing trends in system hardware performance, and further to enable the ultrasound system manufacturer to revise or update self-test protocols for customers' ultrasound systems.

In accordance with the principles of the present disclosure, an ultrasound system is configured to perform periodic self-testing of the system's hardware components. Results of the self-testing are stored on the ultrasound system in a data log, and periodically uploaded to a self-test database. The self-test database is sorted, then analyzed by engineers of the ultrasound system manufacturer to discern variances or trends in ultrasound system hardware performance or operation. As a result of the analysis, updated or improved self-test programs are developed by the system manufacturer and uploaded to and installed on ultrasound systems of the installed base of systems.

In the Drawings:

FIG. 4b illustrates a histogram of self-test data illustrating the test results from the testing of another level of a p.c.b. on the same system as FIG. 4a.

Figure 1A:
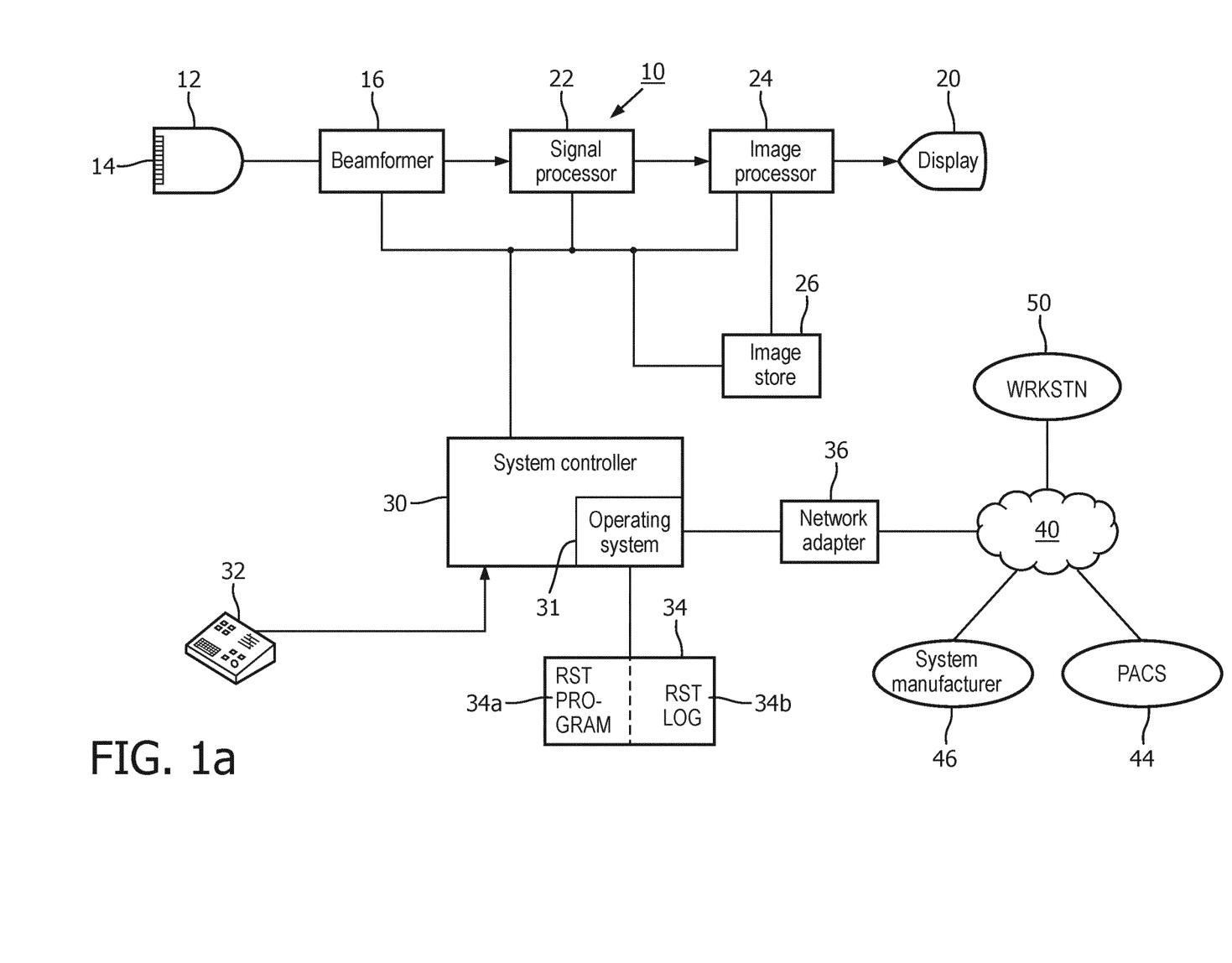
FIG. 1a illustrates an ultrasound system constructed in accordance with the principles of the present disclosure.

Referring first to FIG. 1, an ultrasound system constructed in accordance with the principles of the present disclosure is shown in block diagram form. The ultrasound image acquisition, processing and display path of the ultrasound system 10 starts with an array probe 12 having an array of transducer elements 14. The transducer array transmits ultrasonic waves under control of a beamformer 16 and receives echo signals from the subject being imaged which are converted to electrical signals. The signals received by the individual elements of the array are appropriately delayed and combined by the beamformer 16 to form coherent echo signals. The echo signals undergo specific processing for the type of information acquired and to be displayed such as detection, filtering, Doppler processing, harmonic signal separation, and the like. This processing is performed by a signal processor 22. The processed signals are formed into an image of a desired display format by an image processor 24 and the processed images are displayed on an image display 20. The images may be stored in an image store 26 for further processing and review or later display.

The functioning of the processes of the signal acquisition, image processing and display path is controlled and coordinated by a system controller 30 which is coupled to the components of the signal path. The system controller responds to commands from a user which can be input by a graphical user interface on the display or from a control panel 32 or voice recognition system. The system controller has a processor such as a microprocessor, microcontroller, reduced instruction set computer (RISC), ASIC, or logic circuits, which runs an operating system (OS) 31 that performs functions involving the user interface and the other components of the ultrasound system. The OS also controls communication over a network 40 through a network adapter 36 such as an Ethernet card or modem. The network 40 can be of various types such as Ethernet, FDDI, PPP, token-ring, IEEE 802.11, and others. When the ultrasound system is connected to the network 40 it can communicate with other devices on the network, examples of which include picture archival and communication systems (PACS) 44, and workstation terminals 50.

In accordance with the principles of the present disclosure the ultrasound system 10 comprises a storage device 34 for a resident self-test (RST) program 34*a* and an RST log which stores the results of self-testing conducted by the system. The RST program is executed by the processor running the OS 31 which, by virtue of the reach of the system controller, is able to access most if not all of the active hardware of the ultrasound system. The RST program 34*a* thereby commands the execution of testing of various hardware components of the ultrasound system, such as those of the beamformer, signal processor, image processor, and memory devices, reads the results of the testing, and stores the results in the RST log 34*b*.

The self-testing may be executed aperiodically or on a schedule or on command by a system operator. Some medical devices, particularly those involved in life support or lifesaving, such as defibrillators, execute self-testing whenever they are powered on. Others conduct self-testing on schedules set up by a user. For example, a user could set up the ultrasound system to execute its self-testing once a week, or on alternate days, or on weekends. The ultrasound system can be commanded by a user to run its self-tests, as may occur if the user suspects a problem with the system. The running of the self-testing is also something a service engineer typically does before conducting maintenance or repair of the ultrasound system.

Figure 1B:
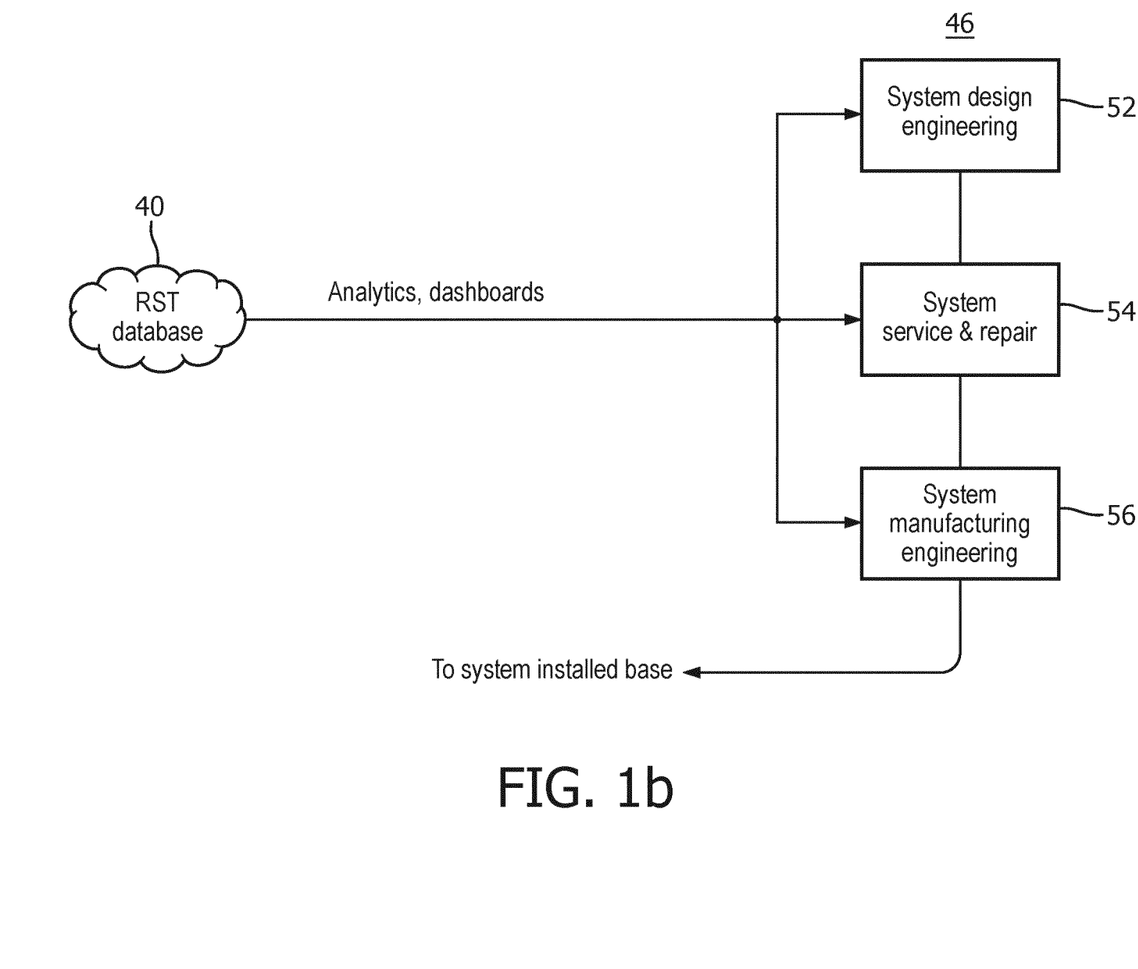
FIG. 1b illustrates the transmittal of the resident self-test (RST) data of the ultrasound system of FIG. 1a to the ultrasound system manufacturer.

In accordance with a further aspect of the present disclosure, the ultrasound system 10 is configured to communicate its RST logs 34*b* over the network 40 to the ultrasound system's manufacturer 46. This transmittal may be done at the command of a system operator or service engineer. It may also be done automatically by the ultrasound system on a schedule or when new RST data has been logged in the RST log, when security protocols and privacy requirements of the facility where the ultrasound system is located permit. FIG. 1*b* illustrates a typical network and routing of the RST log data.

In FIG. 1*b* the network 40 is illustrated as a cloud network of servers where an RST database resides. In this example the RST database can be accessed by a large number of ultrasound systems of the manufacturer's installed base of ultrasound systems. Processing of the RST database may occur on the cloud network 40, whereby the RST data is processed to produce analytics and dashboards revealing desired correlation and measurement of the RST data of many ultrasound systems. The RST data and the analytics and dashboards derived therefrom are accessible by the ultrasound system manufacturer 46. Various departments and functions of the ultrasound system manufacturer may access the RST data and its analytics and dashboards and use them to design, service, maintain and improve the ultrasound systems in the installed base. Examples of such departments and functions are illustrated in FIG. 1*b*. The RST data and its analysis may be accessed by a manufacturer's system service and repair function 54 and its information used to better service, maintain and upgrade ultrasound systems in the installed base. The RST data and its analysis may be accessed by the manufacturer's system manufacturing engineering function 56 and use to improve the manufacture and refurbishing of ultrasound systems. The RST data and its analysis may be accessed by the manufacturer's system design engineering function 52 and used in the design of new ultrasound systems or upgrades for the ultrasound systems of the installed base.

In accordance with a further aspect of the present disclosure, the RST data and its analysis are used by the ultrasound system manufacturer 46 to reveal trends in the operation or performance of hardware of its installed base of ultrasound system. Such trends may not be apparent in the RST log data of a single ultrasound system, but analysis of the RST data from many ultrasound systems of an extended period of time may cause such trends to become apparent. For example, such trending analysis may reveal that components located in one area of the ultrasound system may typically run hotter than components running in other areas. P.c.b.'s that are closer to a cooling fan may run cooler than p.c.b.'s located in other areas of a card cage, for instance. The increased heating may be a factor in component performance or lifetime, or it may not. The analysis of the RST data of a large number of ultrasound systems from widespread geographic areas may indicate performance or lifetime differences in geographic areas with different hot or cold climates or humidity conditions. Measures may be taken to overcome possible adverse effects of these operating conditions. Trending analysis may reveal that some of the self-tests seldom if ever fail, or have been obviated by field upgrades to the ultrasound systems of the installed base. Testing found to no longer be useful can be eliminated, reducing testing run time or allowing more relevant tests to be implemented. Trending analysis may also make predictive monitoring possible, whereby the trending of test results may be used to predict when a specific component fails. The service and repair function 54 can be alerted to such trending and its implications, enabling service engineers to look for such trending when servicing and ultrasound system, and to stock and carry replacement parts. The results of trending analysis can be factored into service engineer training so that developing trends may be spotted more quickly and reliably. Trends of developing issues that manifest themselves as artifacts in ultrasound images of a system can be communicated to ultrasound system users to enable them to know the import of such image artifacts and report them to the manufacturer's service and repair function 54.

In accordance with a further aspect of the present disclosure, RST data and its analysis are used by the ultrasound system manufacturer to modify and refine RST programs. For example, the system design engineering function 52 can refine the RST programs based on an analysis of RST data to prevent fully functional components from failing a self-test, which can cause needless service calls and part replacement. The system design engineering function can use an analysis of RST data to design and develop improved components for system upgrades which require new RST tests or do not require self-testing at all. RST tests which seldom if ever fail or are no longer needed can be removed from RST programs. When such modified and refined RST programs have been produced and themselves tested and verified, they can be delivered for installation in appropriate ultrasound systems of the installed base as indicated by the arrow at the bottom of FIG. 1b. Such delivery is preferably electronic over a network, with the arriving updated RST program automatically installed on an ultrasound system 10. However, this communication can also be more manual, with a service engineer delivering the new RST program to the ultrasound system site and installing it on the ultrasound system.

Figure 2:
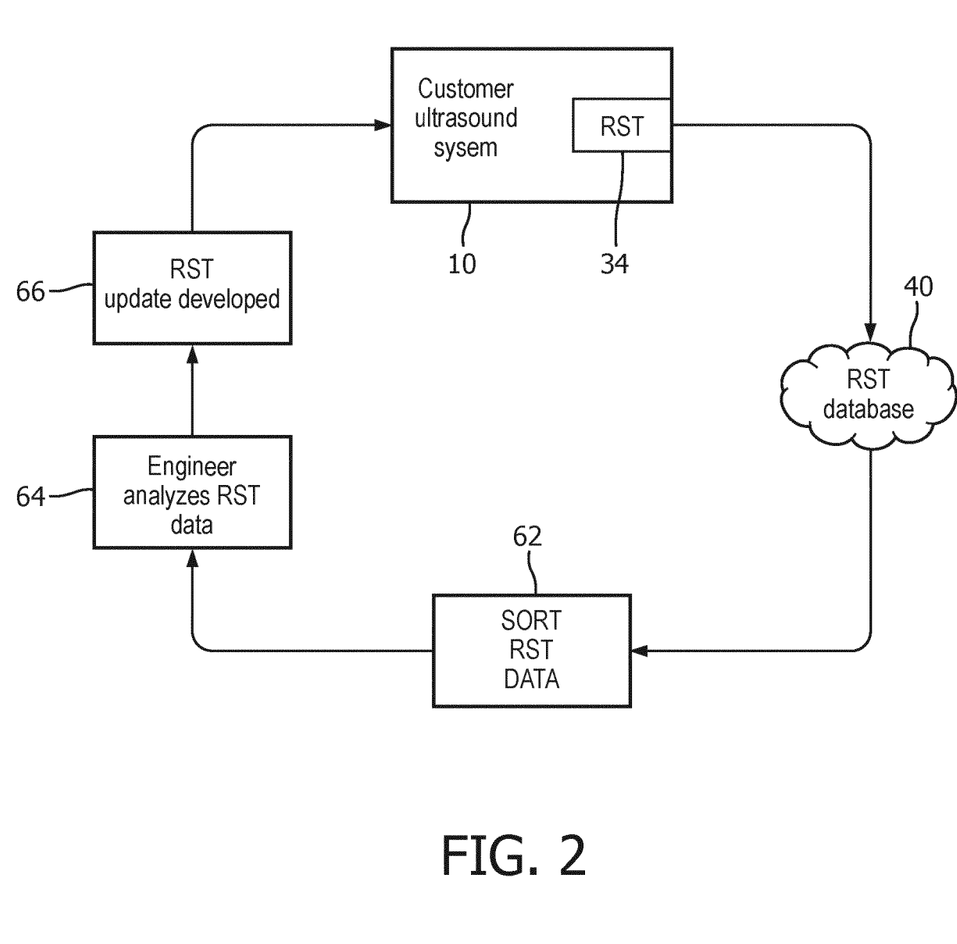
FIG. 2 illustrates a closed-loop system of RST data acquisition by an ultrasound system, and the forwarding of that data to an ultrasound system manufacturer for trend analysis, updating and the installation of an updated RST program on the ultrasound system.

A desirable configuration and implementation of RST testing is a closed-loop path as illustrated in the flowchart of FIG. 2. At the top of the drawing is a customer ultrasound system 10 with RST testing and data logging 34. As indicated by the arrow out of the ultrasound system 10, RST data logs of the ultrasound system 10 are uploaded to an RST database resident on a cloud computing network 40. A server of the cloud computing network may process the RST data to develop analytical and dashboard information, which is then all available for download by an ultrasound system manufacturer as indicated by the arrow out of the network 40. At 62 the RST data is sorted by criteria such as ultrasound system model, date of manufacture, location, upgrade configuration, RST testing results, etc. An engineer analyzes the RST data at 64. As a result of such analysis such as trending analysis, an updated RST program is developed at 66. As the final upward arrow indicates, the loop is closed by delivering the updated RST program to the customer ultrasound system and installing it for operation and execution on the ultrasound system.

Figure 3:
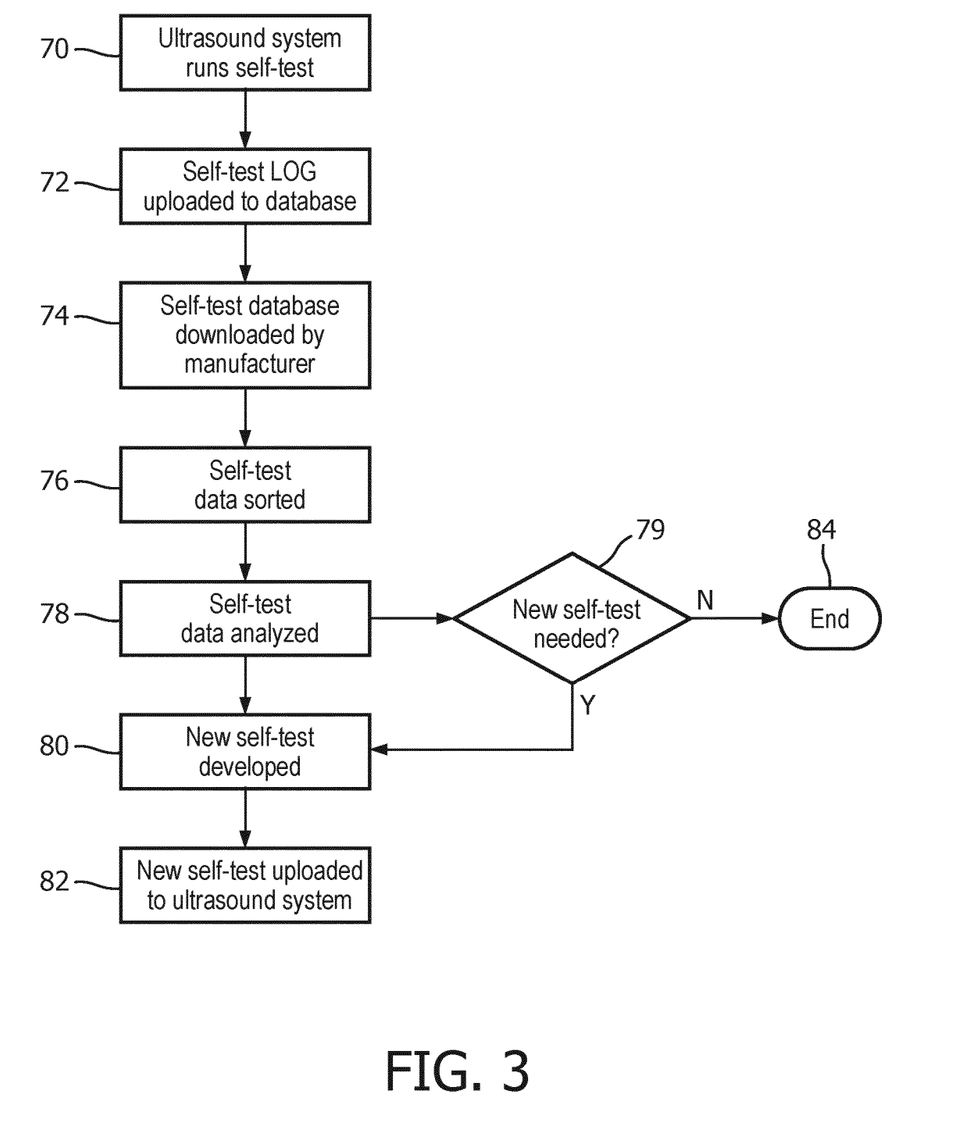
FIG. 3 illustrates a flowchart for conducting self-testing on an ultrasound system and forwarding results of the self-testing to an ultrasound system manufacturer for analysis and development of an updated self-test program for installation in the ultrasound system.

A method for performing self-testing of an ultrasound system in accordance with the present disclosure is illustrated in FIG. 3. The process begins with an ultrasound system running a self-test of a hardware component as shown at 70. The results of the self-test are stored in a self-test log of the ultrasound system and uploaded to a self-test database at 72. At 74 the data of the self-test database and information derived therefrom are downloaded by an ultrasound system manufacturer for analysis. At 76 the self-test data is sorted. Sorting the data is done in accordance with predetermined criteria, such as by ultrasound system model, by the component tested, by test date, by test results, etc. At 78 the self-test data and information are analyzed for hardware faults or trends in hardware operation or performance. If it is determined at 79 from the analysis that a self-test program should be modified or a new self-test is desired, as illustrated by the situation discussed in conjunction with FIGS. 4a and 4b below, the process proceeds to 80 where a new self-test program is developed or an existing test modified. If it is determined that no self-test modifications or development are productive, the process ends at 84. At 82 a new or modified self-test is uploaded to the ultrasound system.

Figure 4A:
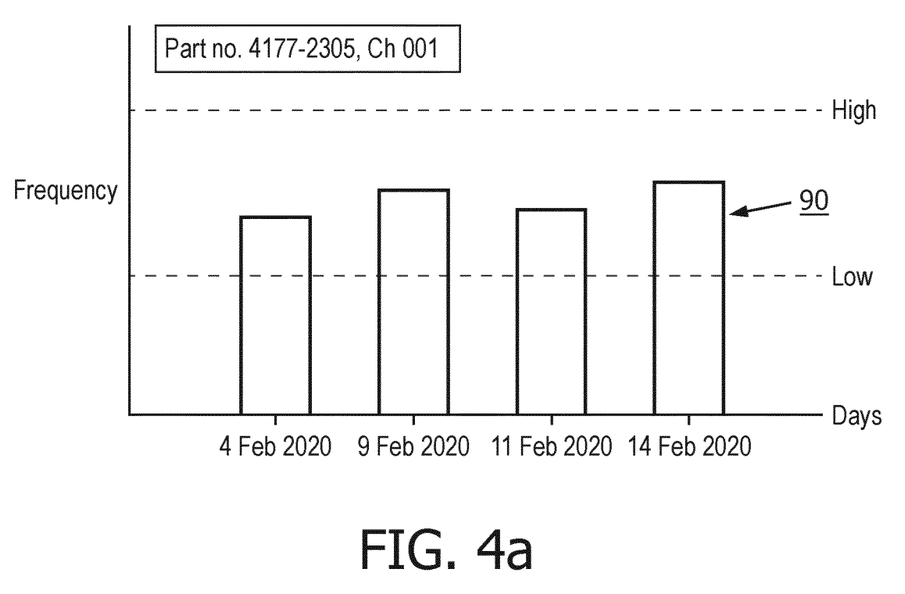
FIG. 4a illustrates a histogram of self-test data illustrating the test results from the testing of circuitry of a p.c.b.
Figure 4B:
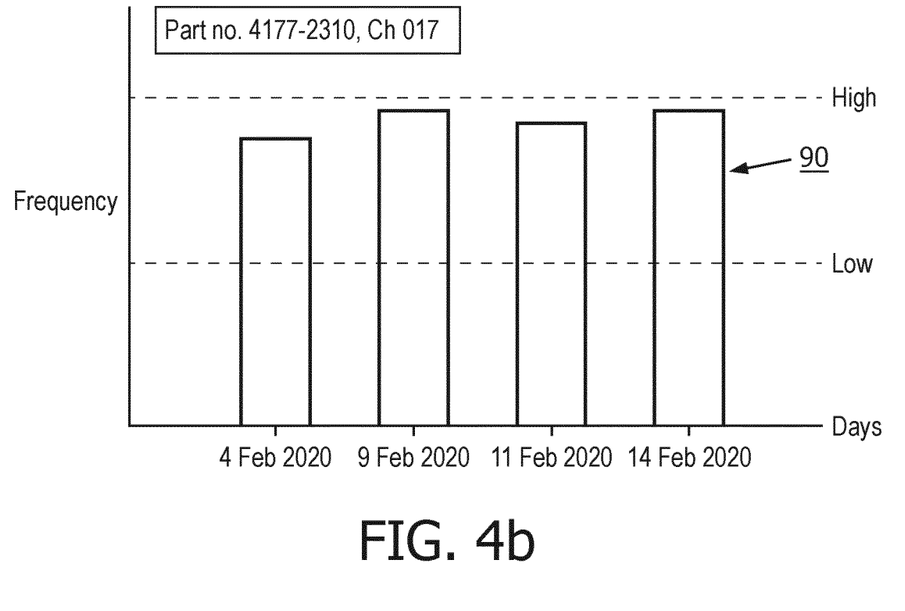

FIGS. 4a and 4b illustrate an example of dashboards of analyzed RST data produced as a result of self-testing of channel boards of an ultrasound system. Each dashboard illustrates a histogram showing the results of testing at different times of the transmit function of a particular beamformer channel, channel 001 of the beamformer 16 in FIG. 4a, and channel 017 of the beamformer in FIG. 4b. In a digital ultrasound system, the transmit waveforms which the beamformer is to provide to the transducer elements 14 of the probe 12 are stored in memory in digitized form. When a beam is to be transmitted by the probe, the digitized values of a desired waveform are clocked out of the memory at the appropriate time and frequency and converted to an analog waveform for a transducer element by a D/A (digital-to-analog) converter. A typical self-test of a transmit beamformer channel is to command the memory of the channel board to clock out a known waveform, then to detect the outputted waveform and frequency-analyze the waveform to determine if the output waveform is of the desired frequency. The results of such testing are illustrated in histogram form in FIGS. 4a and 4b.

In FIG. 4a it is seen that beamformer channel 001 was tested on four different days in February and the results present by four histogram bars 90. Beamformer channel 001 is a channel physically located on a channel board with a part number 4177-2305 in this example. FIG. 4b shows the results of self-testing of channel 017 of the beamformer on the same days, again with the results presented as histogram bars 90. The channel 017 is located on a different channel board in the ultrasound system, this one with a part number 4177-2310. In this example, the difference in part numbers shows that the channel board on which channel 017 is located is of a later revision (2310) than the channel board on which channel 001 is located; channel 017 is on a more recently updated version of the channel boards used by the ultrasound system.

Analysis of the histogram data of FIG. 4a reveals that the results of self-testing of channel 001 show that the channel consistently produced an output signal in the middle of the desired frequency range. The tops of the histogram bars 90 are seen to be consistently located in the middle of the high dashed line and the low dashed line of the histogram, lines which demarcate the target range for the channel output frequency. However the trending of histogram bars 90 in FIG. 4b for channel 017 is seen to be consistently at the high end of the target frequency range between the dashed lines. Both channels passed the self-test because the measured output frequency was always in the target frequency range for both channels, but channel 001 produced consistently centered test results whereas channel 017 produced consistent results at the high end of the range. Follow-up investigation into these consistent trends revealed that the newer revision (2310) of the channel board of channel 017 had a higher performance as intended for its design, and that the higher measured frequency results was to be expected for normal operation of the higher revision of the channel board. As a result, the self-test program for the ultrasound system 10 was modified to provide slightly different tests for the different channel board revisions, so that normal operation of both channel boards would produce centered frequency results for their respective self-tests. As a specific example, the frequency center point or range of acceptable frequencies may be modified in the self-test for a channel such as channel 017 to reflect a different acceptable output range.

Another example of the use of ultrasound system hardware self-testing is testing the pulser circuit components of an ultrasound system. The pulser circuit is used to drive elements of a transducer array with the proper voltage levels. When ultrasound probes are designed, their acoustic energy output is measured for different transmit conditions and transducer element drive voltages. The peak acoustic output of the probe is then calibrated in units of the Mechanical Index (MI), the units of acoustic energy used by clinicians for the conduct of various ultrasound exams. When a clinician sets the system for an MI of 0.8, for instance, the drive voltages to the probe produce output energy at that level. A self-test of the pulser circuit or circuits can be used to verify this. The pulser circuitry may be located on the channel boards of the beamformer or may be located on its own pulser p.c.b. A test would command a certain MI or drive voltage to be transmitted, and the output voltage level of pulser circuitry could be measured to ascertain if the output produced by the pulser circuitry is indeed at the intended peak or r.m.s. level. Repeated testing over time of the pulser circuitry by the self-test program could provide confidence that the output of the pulser circuit is not varying from its intended levels.

Another example of self-testing of ultrasound system hardware components is self-testing of memory devices. A memory device should be capable of being written into with a certain dataset then, when the data is read out of the memory device, it should be identical to the initial dataset. A self-test which compares data written into and read out of a memory device is a typical way to test a memory device, such as the memory devices used in the image store 26. Other measures may also be used to test a memory device. For instance, the time to write data into a memory device and the time to read the data out may in some instances be critical. An example of this is a memory device which is used to effect a delay time in a beamformer. Some beamformers operated by writing the data of a received echo signal into a memory device at one point in time, then reading the data out of the memory device at a later point in time. The duration between the write-in time and the read-out time provides the delay time of the echo signal for use in beamforming. If the times to write data into a memory device and to read it out later vary from what is intended, the delay time can be incorrect, resulting in inaccurate steering or focusing of an ultrasound beam and a degraded ultrasound image. Thus, one test for a memory device may be to measure these write-in and read-out times and record them, to ascertain whether there has been any drift in access times for the memory device which could adversely affect beam focusing and steering.

Hardware components for the reception and processing of ultrasound signals may also be tested by the RST. For instance, the analog-to-digital converters (ADCs) used to digitize the analog echo signals received by a probe may be self-tested by applying an analog voltage within the range of expected echo signals to an ADC and recording the digitized output value. The digitized value is then compared with the expected digital value. Another example of receive hardware that may be self-tested are the ASICs (application specific integrated circuit) typically located prior to or within the beamformer. Typical input values are applied to an ASIC and an output value is measured to see if the processing of the input data by the ASIC produced the expected result.

Other examples of ultrasound system hardware components which may be analyzed by self-testing readily occur to those skilled in the art.

It should be noted that an ultrasound system suitable for use in an implementation of the present disclosure, and in particular the component structure of the ultrasound system of FIG. 1, may be implemented in hardware, software or a combination thereof. The various embodiments and/or components of an ultrasound system, or components and controllers therein, also may be implemented as part of one or more computers or microprocessors. The computer or processor may include a computing device, an input device, a display unit and an interface, for example, for accessing the internet. The computer or processor may include a microprocessor. The microprocessor may be connected to a communication bus, for example, to access a PACS system, workstations, or a data network for transmittal of data to and from the ultrasound system as is the case in the system of FIG. 1. The computer or processor may also include a memory. The memory devices such as those used in the image store 26 may include Random Access Memory (RAM) and Read Only Memory (ROM). The computer or processor further may include a storage device, which may be a hard disk drive or a removable storage drive such as a floppy disk drive, optical disk drive, solid-state thumb drive, and the like. The storage device may also be other similar means for loading computer programs or instructions for conducting a resident self-test program on an ultrasound system, logging the results, and transmitting to self-test results for analysis and receiving a new self-test program as explained above.

As used herein, the term "computer" or "module" or "processor" or "workstation" may include any processor-based or microprocessor-based system including systems using microcontrollers, reduced instruction set computers (RISC), ASICs, logic circuits, and any other circuit or processor capable of executing the functions described herein. The above examples are exemplary only and are thus not intended to limit in any way the definition and/or meaning of these terms.

The computer or processor executes a set of instructions such as an RST program that are stored in one or more storage elements, in order to process input data or carry out system operations. The storage elements may also store data or other information. The storage element may be in the form of an information source or a physical memory element within a processing machine. The set of instructions of an ultrasound system including those controlling the acquisition, processing, and display of ultrasound images and instructions for self-testing hardware components of an ultrasound system as described above may include various commands that instruct a computer or processor as a processing machine to perform specific operations such as the methods and processes of exercising hardware components and recording results of such as described above. The set of instructions may be in the form of a software program. The software may be in various forms such as system software or application software and which may be embodied as a tangible and non-transitory computer readable medium. Further, the software may be in the form of a collection of separate programs or modules within a larger program or a portion of a program module. The software also may include modular programming in the form of object-oriented programming. The processing of input data by the processing machine may be in response to operator commands issued from a control panel, or in response to results of previous processing, or in response to a request made by another processing machine.

Furthermore, the limitations of the following claims are not written in means-plus-function format and are not intended to be interpreted based on 35 U.S.C. 112, sixth paragraph, unless and until such claim limitations expressly use the phrase "means for" followed by a statement of function devoid of further structure.

What is claimed is:

1. A method for conducting resident self-tests (RST) of an ultrasonic diagnostic imaging system comprising:
running a self-test program on an ultrasound system to test a hardware component of the ultrasound system and storing results of the test in a self-test log;
uploading the self-test log to a database of self-test data;
downloading the database of self-test data for analysis;
sorting the self-test data;
analyzing the self-test data, the analyzing including trending analysis for predictive monitoring so that hardware components can be repaired or replaced before their performance has reached a failure level;
developing a new self-test program; and uploading the new self-test program to the ultrasound system.

2. The method of claim 1, wherein storing the results of the test further comprises storing the results of self-testing in a self-test log on the ultrasound system.

3. The method of claim 2, wherein storing the results of self-testing further comprises storing the results of self-testing in a log which contains the results of tests conducted at a plurality of different times.

4. The method of claim 3, wherein uploading the self-test log further comprises uploading data of the self-test log to a database which contains self-test data from plurality of individual ultrasound systems.

5. The method of claim 4, wherein uploading the self-test log further comprises uploading data of the self-test log to a cloud database.

6. The method of claim 5, wherein uploading the self-test log to a cloud database further comprises uploading the self-test log to a cloud network for processing and analysis.

7. The method of claim 4, wherein downloading the database of self-test data further comprises downloading the database to an ultrasound system manufacturer.

8. The method of claim 7, wherein sorting the self-test data further comprises sorting the self-test data by predetermined criteria.

9. The method of claim 8, wherein analyzing the self-test data further comprises analyzing the self-test data to reveal trends in the operation or performance of the hardware component.

10. The method of claim 9, wherein developing a new self-test program further comprises developing a new self-test program test for a hardware component in consideration of a trend revealed by the analyzing.

11. The method of claim 10 wherein developing a new self-test program further comprises eliminating a self-test that is no longer needed for a self-test program.

12. The method of claim 10, wherein uploading the new self-test program further comprises manually or automatically uploading the new self-test program to the ultrasound system and installing the new self-test program in the ultrasound system.

13. The method of claim 1, wherein running a self-test program on an ultrasound system to test a hardware component of the ultrasound system further comprises performing a self-test of a channel board of a beamformer of the ultrasound system.

14. The method of claim 1, wherein running a self-test program on an ultrasound system to test a hardware component of the ultrasound system further comprises performing a self-test of a memory device of the ultrasound system.

15. The method of claim 2, wherein running a self-test program on an ultrasound system to test a hardware component of the ultrasound system further comprises performing a self-test of a transmit component of the ultrasound system.

16. The method of claim 2, wherein running a self-test program on an ultrasound system to test a hardware component of the ultrasound system further comprises performing a self-test of a receive component of the ultrasound system.

17. An ultrasound system for conducting resident self-tests (RST) of an ultrasonic diagnostic imaging system comprising:

an ultrasound system comprising a processor and a memory to store instructions that when executed on the processor cause the processor to:

run a self-test program on an ultrasound system to test a hardware component of the ultrasound system and storing results of the test in a self-test log;

upload the self-test log to a database of self-test data;

download the database of self-test data for analysis;

sort the self-test data;

analyze the self-test data for predictive monitoring so that hardware components can be repaired or replaced before their performance has reached a failure level;

develop a new self-test program; and upload the new self-test program to the ultrasound system.

\* \* \* \* \*